United States Patent [19]

Bunker et al.

[11] Patent Number: 5,128,182
[45] Date of Patent: Jul. 7, 1992

[54] COMPOSITE INTEGRAL SHEET OF WRAP MATERIAL AND METHOD OF MAKING

[75] Inventors: Linda L. Bunker, Appleton, Ga.; Arthur C. Berger, Mound, Minn.; Patrick L. Maynard, Combined Locks; Robert Patterson, Neenah, both of Wis.

[73] Assignee: The James River Corporation, Richmond, Va.

[21] Appl. No.: 759,717

[22] Filed: Sep. 12, 1991

Related U.S. Application Data

[63] Continuation of Ser. No. 372,165, Jun. 27, 1989, abandoned, which is a continuation-in-part of Ser. No. 333,034, Apr. 4, 1989, abandoned.

[51] Int. Cl.⁵ .............................................. B32B 7/10
[52] U.S. Cl. .................................. 428/34.3; 206/204; 383/109; 383/113; 383/120; 426/121; 426/124; 426/127; 428/35.2; 428/36.6; 428/68; 428/72; 428/195; 428/198; 428/211; 428/218; 428/219; 428/178
[58] Field of Search ............ 428/34.3, 35.2, 36.6, 428/68, 72, 195, 198, 211, 218, 219, 178; 206/204; 383/109, 113, 120; 426/121, 124, 127

[56] References Cited

U.S. PATENT DOCUMENTS

| | | | |
|---|---|---|---|
| 2,314,876 | 3/1943 | Greene | 428/34.3 |
| 3,288,353 | 11/1966 | McCullough | 229/87 |
| 3,365,116 | 1/1968 | Ludlow | 229/55 |
| 3,399,819 | 9/1968 | Rennie et al. | 229/31 |
| 3,505,083 | 4/1970 | Schelhorn | 428/198 |
| 3,642,550 | 2/1972 | Doll | 156/78 |
| 3,961,119 | 6/1976 | Thomas | 428/178 |
| 4,081,580 | 3/1978 | Kato | 428/134 |
| 4,137,333 | 1/1979 | Daswick | 428/120 |
| 4,263,360 | 4/1981 | Adelman | 428/238 |
| 4,270,658 | 6/1981 | Schuster | 428/34.3 |
| 4,515,840 | 5/1985 | Gatward | 428/34.3 |
| 4,575,000 | 3/1986 | Gordon et al. | |
| 4,629,064 | 12/1986 | Barner | 426/431 |
| 4,735,846 | 4/1988 | Larsonneur | 428/198 |

*Primary Examiner*—Ellis P. Robinson
*Assistant Examiner*—Archene Turner
*Attorney, Agent, or Firm*—Finnegan, Henderson, Farabow, Garrett & Dunner

[57] ABSTRACT

A composite integral sheet of wrap material which includes a first layer of absorbent material, a second layer of printable material and an impermeable pigmented polymer layer interposed between the first and second layers. The composite wrap material has a plurality of air pockets formed between at least one of the first or second layers and the polymer layer, by discontinuously bonding the first or second layers to the polymer material. A method of making the composite integral sheet.

17 Claims, 3 Drawing Sheets

COMPOSITE INTEGRAL SHEET OF WRAP MATERIAL AND METHOD OF MAKING

This application is a continuation of application Ser. No. 07/372,165, filed Jun. 27, 1989, now abandoned, which is a continuation-in-part of application Ser. No. 07/333,034, filed Apr. 4, 1989, now abandoned.

BACKGROUND

1. Field of the Invention

This invention relates to composite wrap materials, and more particularly to composite wrap materials used primarily for packaging hot foodstuffs, with the composite wrap facilitating heat retention, moisture control and masking of food staining. The invention also relates to a method of making the composite wrap materials.

2. Background of the Invention

Composite wrap materials have long been used to package hot foodstuffs. In addition to keeping the foodstuff relatively fresh for a period of time, the wrap facilitates heat retention by the foodstuff after it is made, but before it can be consumed. Further, the wrap presents the food in an eye appealing manner.

Current commercial wraps include polyethylene coated paper, hot melt coated paper, foil/tissue laminations, dry wax, etc. Unfortunately, these wrap materials have the serious disadvantage of high moisture retention to maximize heat retention. Consequently, the wrapped, heated foodstuff becomes soggy and unpalatable. Additionally, unsightly grease produced during heating of the foodstuff can remain in the wrapped package, causing additional sogginess as well as unsightly grease stains. Even where moisture vapor is permitted to escape, for example, through semi-permeable thermoplastic films, unsightly grease may still appear on the thermoplastic film layer, and can even be reabsorbed by the food from which it originated.

Another disadvantage of known food wrap composite materials is that they all utilize only two layers (two-ply)—typically a thermoplastic layer and a second paper layer. If, for example, the second paper layer is used on the outer surface of the wrap-away from the foods to permit printing of a logo, name, descriptions, etc.—then there is no inner absorbent layer to absorb any excess vapor which may not escape through a semi-permeable thermoplastic inner layer, but which may condense on that layer and then be absorbed by the foodstuff. In addition, grease may collect on the thermoplastic layer and also be absorbed by the foodstuff. Both the condensed vapor and grease can contribute to unsightly stains and, even worse, to make the heated foodstuff soggy and unpalatable.

A good example of the above situation is illustrated in U.S. Pat. No. 4,515,840. This patent teaches a layer generally adjacent the foodstuff which is a thermoplastic material, semi-permeable to water vapor but not grease while the outer layer is a printable paper. As discussed above, there would be no inner layer to absorb condensed water vapor which did not pass through the semi-permeable thermoplastic material and, more importantly, no inner layer to catch or absorb any grease from the hot foodstuff. In either case, the grease or condensed water vapor would necessarily return to the foodstuff thereby making it soggy and unpalatable.

If, as also disclosed in U.S. Pat. No. 4,515,840, the paper layer is adjacent to the foodstuff and the second, outer layer is the thermoplastic material, there would be no outer layer for purposes of printing indicia or other identifying marks. Furthermore, in both cases there is the more serious disadvantage in that the heated foodstuff is giving off its own heat via the water vapor which is allowed to pass through the semi-permeable thermoplastic material, thereby permitting the foodstuff to cool off.

Accordingly, there is presently a need to develop a composite wrap material capable of overcoming the aforementioned deficiencies. In addition, there is a need to develop a method of manufacturing this composite wrap material.

SUMMARY OF THE INVENTION

The objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, there is disclosed:

A composite integral wrap material, including:

a first layer of absorbent material;

a second layer of printable material; and a water vapor impermeable polymer layer interdisposed between the first and second layers, wherein at least one of the first and second layers is discontinuously bonded to a respective side of the polymer layer at spaced locations, so that at least one of the first and second layers forms air pockets with the polymer layer at locations between the bond locations.

There is also disclosed:

A process for making an integral composite wrap material having air pockets on at least one side of an impermeable polymer, including the steps of:

conveying an impermeable polymer to a location between a pair of nip rollers rotating in opposite directions;

directing a first layer of absorbent material to said nip rollers and adjacent to one side of the impermeable polymer;

directing a second layer of a printable material to said nip rollers and adjacent to the other side of the impermeable polymer;

controlling the temperature of a surface of at least one of the pair of nip rollers, the other one of the pair of nip rollers having a surface with peripherally spaced protrusions extending therefrom for physical engagement with the first and second layers, the impermeable polymer, and the surface of at least one of the pair of nip rollers; and passing the first and second layers and the impermeable polymer between the pair of nip rollers to control the temperature of the impermeable polymer and to discontinuously bond at least one of the first and second layers to a respective side of the impermeable polymer at spaced locations to form air pockets with the impermeable polymer at locations between the bond locations.

The invention consists in the novel application of converting methods and products shown and described. The accompanying drawings, which are incorporated in and constitute a part of the specification, illustrate various aspects of the invention and, together with the

DESCRIPTION OF THE PREFERRED EMBODIMENTS

The present invention is directed to a 3-ply composite wrap material for hot foodstuffs, having three layers—a first absorbent layer, a second printable layer and a water vapor impermeable, polymer layer interposed between the first and second layers. The invention also concerns the method of manufacturing the 3-ply wrap material.

Figure 1:
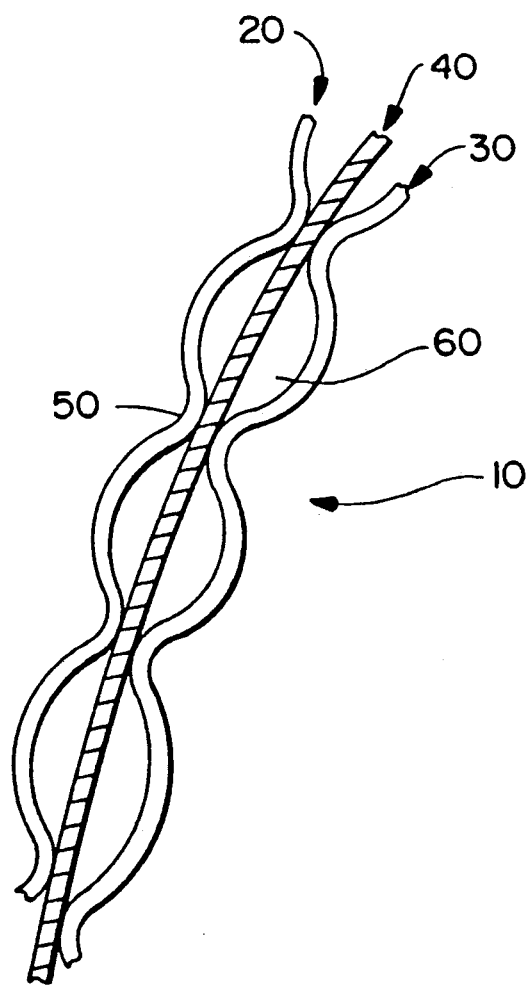
FIG. 1 is a cross sectional view of one embodiment of the composite wrap material according to the invention.

Referring to FIG. 1, and as embodied herein, there is shown generally a 3-ply composite wrap material 10. The material 10 is made of a first, absorbent layer 20, a second, printable layer 30, and an impermeable polymer layer 40 interposed between the first and second layers. The first and second layers are discontinuously, or spot bonded 50 to the respective opposite sides of the layer 40 which is interposed therebetween to form air pockets 60.

One side of the absorbent layer 20 is placed adjacent to the hot foodstuff. On the other side of layer 20 is the impermeable polymer layer 40. Layer 20 absorbs water vapor from the hot foodstuff which has passed through it and has condensed on the impermeable polymer layer 40, as well as any grease which may be present. As embodied herein, the absorbent layer 20 preferably has good fold retention with a basis weight ranging from 5 to 50 lbs/3,000 sq. ft., and more preferably ranging from 10 to 20 lbs/3,000 sq. ft. The basis weight of the absorbent layer 20 must be such that it can absorb all the water vapor lost by the hot sandwich and condensed on the impermeable layer 40.

According to the invention, the absorbent layer 20 may be any material comprised primarily of cellulosic fibers. Materials for use as the aborbent layer 20 are preferably selected from the group of materials consisting of nonwoven tissue, air laid fabric, wet laid tissue, wet or dry creped tissue and embossed papers.

In accordance with the invention, the printable layer 30 is positioned adjacent to the side of the impermeable polymer layer 40 away from the hot foodstuff and is used for printing of identifying symbols, marks, labels or other indicia of source. The printable layer 30 preferably has good fold retention with a basis weight ranging from 10 to 50 lbs/3,000 sq. ft., and more preferably ranging from 10 to 25 lbs/3,000 sq. ft.

As embodied herein, the printable layer 30 may be any material having a printable surface, such as a coated paper. Typically, one surface of the printable layer 30 has a smoother, glazed surface. Materials capable of use as the printable layer 30 may be selected from the group of materials consisting of machine glazed papers and coated papers.

In accordance with the objects and advantages of the invention, the densities of the printable layer 30 and absorbent layer 20 of composite wrap 10 may be varied to control the heat flux through the composite wrap 10 and the absorbency of layer 20. When the absorbent layer 20 has a high density the radiation of heat away from the hot foodstuff is minimized because the absorbent layer reflects and attenuates the radiant heat energy given off by the sandwich. The lower density printable layer 30 has a low thermal conductivity which, in combination with the air pockets 60, reduces heat transfer from the higher density layer to the environment.

According to the invention, the impermeable layer 40 is interposed between the first and second layers 20 and 30, respectively. The layer 40 acts as an impermeable barrier to prevent both grease penetration and water vapor penetration from the hot foodstuff to the outside of the composite wrap material 10. In effect, the layer 40 acts as a condensation surface for the water vapor. The absorbent layer 20 then absorbs the condensate and grease to keep the hot foodstuff from becoming soggy and unpalatable. More importantly, by preventing the passage of water vapor, the layer 40 facilitates heat retention by the hot foodstuff by retaining the heat from the condensed vapor within the package. By condensing the water vapor lost by the hot sandwich, the heat in that vapor is recovered within the sandwich wrap. This recovered heat minimizes subsequent heat loss by the sandwich, thereby maximizing sandwich temperature during holding. By preventing the passage of grease, the layer 40 also helps to prevent unsightly grease stains on the outside of the composite wrap material 10.

Impermeable polymers useful in accordance with this invention include any extrudable material which can act as a complete barrier, e.g., is impermeable to water vapor and grease, such as polyethylene. Polymer materials useful in accordance with the invention are preferably selected from the group of polymers consisting of wax/polymer blends, polyethylene, polyvinylidene chloride, ethylene acrylic acid, copolymer polypropylene, polyester, polyisobutylene, nylon, polymethylpentene, ethylene vinyl acetate and hot melts.

As further embodied herein, the polymer material may be pigmented. This pigmentation serves to give opacity to the polymer material to mask stains created by the grease and condensate absorbed by the absorbent layer 20, as well as any grease or condensation which may be present on the layer 40. The opaque quality of the polymer material helps to improve the aesthetic qualities of the wrapped food product by masking any grease and water stains.

Pigments which may be mixed with the polymer material to provide opacity include any metallic oxide pigments and any organic dye colorants. Pigments useful in accordance with the invention are preferably selected from the group consisting of titanium dioxide, calcium carbonate and zinc oxide.

The pigments can be mixed with the polymer material according to any well known method prior to extruding or forming the pigmented polymer layer 40.

According to one embodiment of the invention, there are a plurality of air pockets 60 formed on at least one side of the impermeable polymer layer 40 between discontinuous or spot bonded portions 50 of the absorbent layer 20 and printable layer 30 adjacent the respective opposite sides of the layer 40. The air pockets 60 serve to insulate the hot foodstuff item by improving heat retention by decreasing conductive heat transfer. As shown in FIG. 1, air pockets 60 are formed on both sides of the impermeable polymer layer 40.

The air pockets 60 may have a variety of shapes or pattern configurations; no one shape or pattern is preferred according to the present invention. The size and shape of the air pockets 60 can be determined by aesthetic considerations. In general, the individual air pockets have a surface area ranging from 0.5 in$^2$ to 3.5 in$^2$.

The size of the air pocket is limited, for example, by the pattern depth of the roll 90, discussed below, the temperature of the extrudate 70 during production and the amount of compression that the composite wrap 10 will be subjected to during packing or storage.

Figure 2:
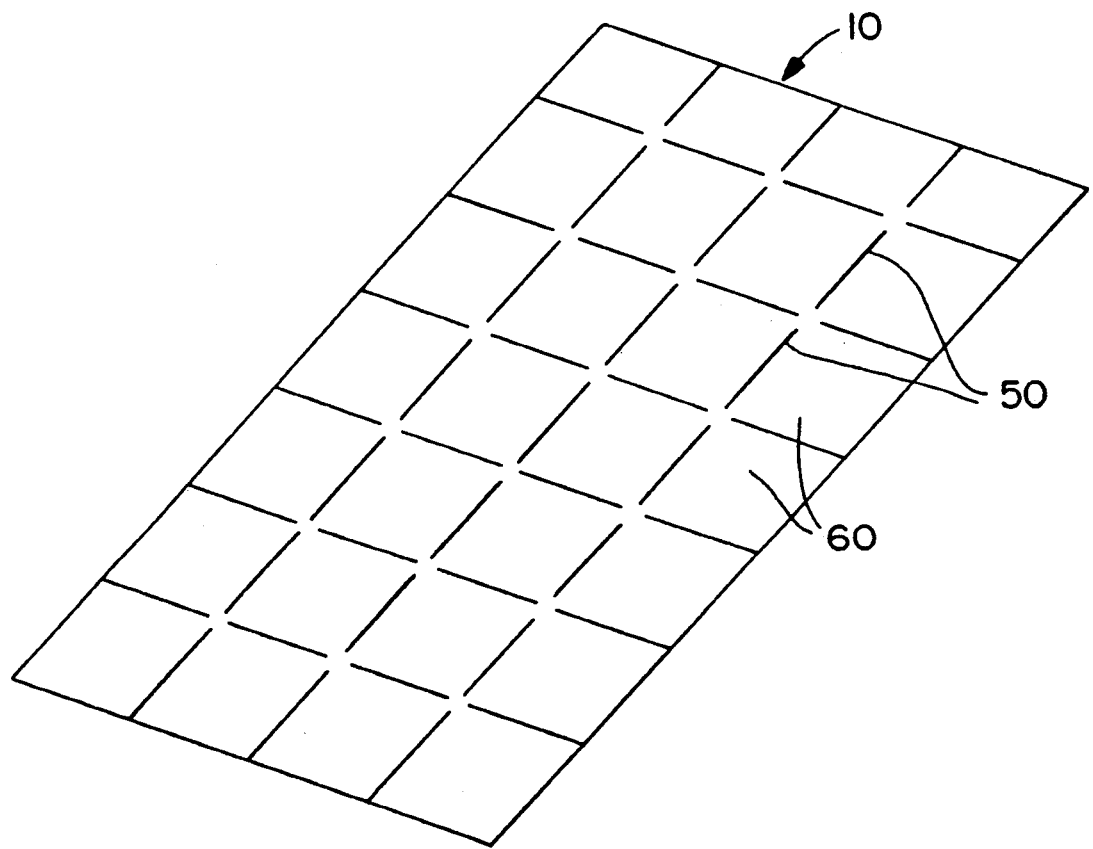
FIG. 2 is a perspective of the top surface of one embodiment of the composite wrap material according to the invention.

In accordance with the invention, and as shown in FIG. 2 for illustration purposes, the spot bonding creates a rectangular pattern in the wrap material 10. None of the individual spot bonds are connected, resulting in a pattern whereby all of the air pockets 60 are interconnected. Thus, the air contained in any individual pocket 60 can move throughout the composite wrap material 10. This allows for the maximum amount of air to be trapped between the layers of the composite wrap while minimizing the chance of popping or blowing holes in any of the three layers when the finished composite wrap is tightly compressed during packing or storage.

According to one preferred embodiment, the composite wrap material 10 is used in sheet form to wrap hot foodstuffs.

In another preferred embodiment, the composite wrap material may be formed into pouches for wrapping hot sandwiches. The pouches may be manufactured according to any well known method.

In still another preferred embodiment, the composite wrap material may be formed into a bag in which the hot foodstuff can be placed. The bags may be manufactured according to any well known method.

Furthermore, a skilled artisan will recognize that "pouches" generally means an enclosure sealed on two of four sides, while a "bag" is an enclosure sealed on three of four sides.

Further in accordance with the invention, there is disclosed a method of manufacturing the 3-ply, composite wrap material 10 of the invention by extrusion lamination. With specific reference to FIG. 3, the preferred method will be described in detail below.

Figure 3:
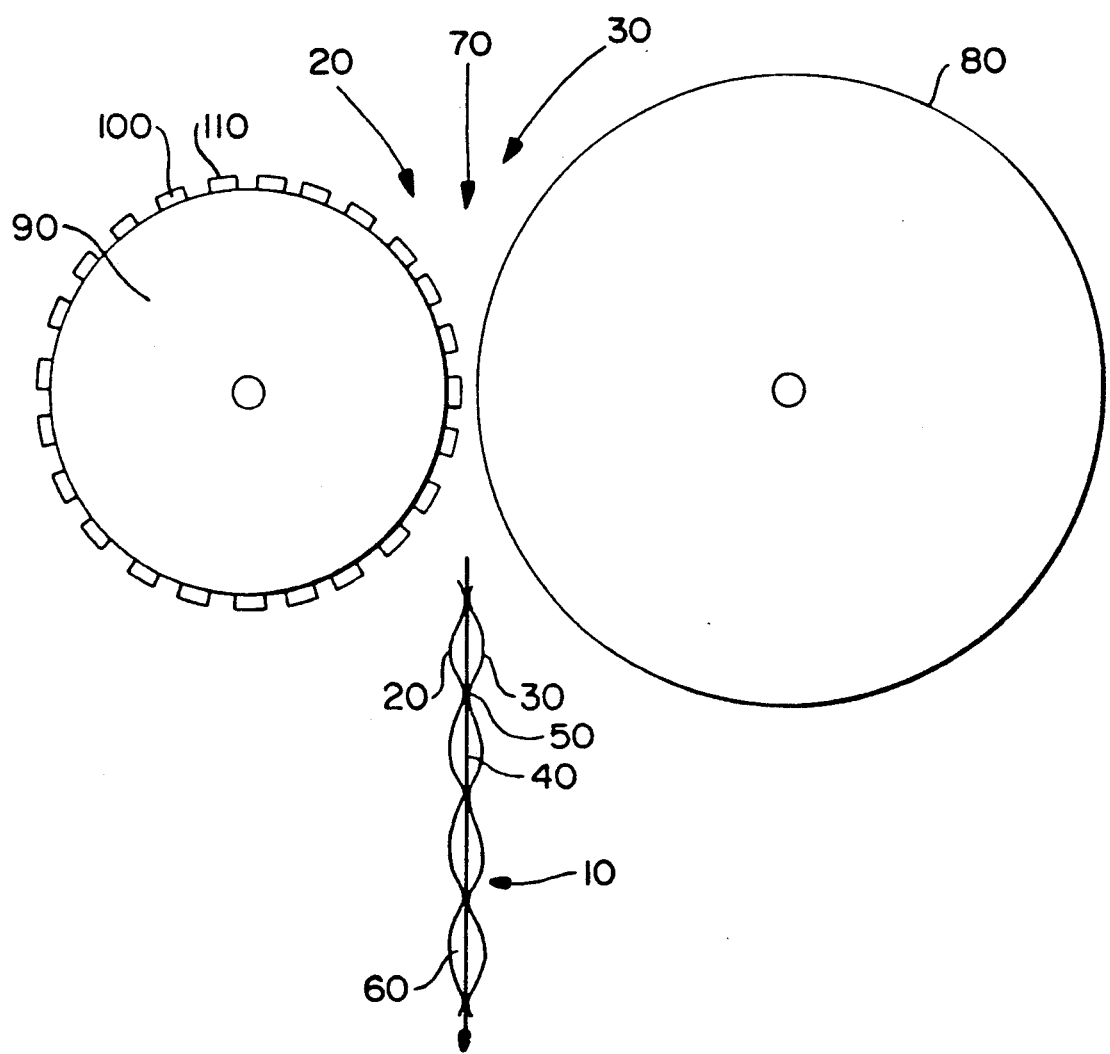
FIG. 3 is a schematic view of an apparatus used to produce the composite wrap material according to the invention.

The extrusion lamination process of making the 3-ply, composite wrap material 10 is schematically shown in FIG. 3. An impermeable pigmented polymer extrudate 70, which when chilled sets to form the impermeable polymer layer 40, is conveyed towards a pair of nip rolls 80, 90. The extrudate 70 may be formed and conveyed by any known method.

In accordance with the invention, the extrudate 70 is generally at a temperature in the range of 450° to 600° F., and more preferably 500° to 550° F. prior to contact with at least one of the nip rollers.

Because the layer 40 is impermeable, the extrudate 70 must be extruded as a pinhole free film at a thickness sufficient to be able, when cooled, to form an impermeable barrier. Although some pinholing may occur as a result of paper fibers penetrating through the polymer film when the polymer film contacts layers 20 and 30, the amount of pinholing must be minimized to reduce water vapor loss, and hence heat loss.

The first and second layers 20 and 30, respectively, are directed by any well known means into an adjacent, non-contact position with the extrudate 70 on its respective opposite sides prior to passing through the nip rolls 80, 90. The layers contact for the first time as they pass through nip rolls 80, 90 to form a three-layered material.

In accordance with the invention, at least one of the rollers 80, 90 is cooled to a temperature sufficient to cool and set the extrudate 70 when it indirectly contacts the roller through either the absorbent layer 20 or printable layer 30 to form the impermeable polymer layer 40. Typically, as shown in FIG. 3, the smooth surfaced roller 80 is the roller whose surface temperature is controlled by any well known means. The temperature of the roller 80 can vary according to the temperature of the extrudate and expected time of contact. According to the invention, either the absorbent layer 20 or printable layer 30 may be on the side directly contacting the chilled roller 80.

At a time simultaneous with the cooling and setting of the extrudate 70 on the roller 80 to form the layer 40, the second roller 90 is acting in physical engagement with the three-layered material to discontinuously bond or laminate the first and second layers 20, 30 with the respective opposite sides of the polymer layer 40 interposed therebetween.

In accordance with the invention, the surface of the roller 90 has a series of raised protrusions 100 spaced around the periphery. The surface 110 of a raised protrusion 100 physically engages the first, second and extrudate layers against the surface of roller 80 to discontinously bond or laminate the three layers at points 50 and thereby form air pockets 60 on both sides of the then formed layer 40 between the respective sides of the layer 40 and the first and second layers 20, 30.

The size and shape of the air pockets are determined by the size and shape of the protrusions 100. As embodied herein the protrusions 100 can be any shape or size with the limitations regarding air pocket size specified above and the height limitations given below constituting preferred limitations for the reasons given.

According to a preferred embodiment of the invention, the height of the protrusions 100 is in the range of 0.03 to 0.07 inches, more preferably about 0.045 inches. If the protrusions 100 are less than 0.03 inches, the air pockets 60 will be too small as defined by this product. And if the protrusions 100 are greater than 0.07 inches, then the air pockets 60 will be too large and the composite wrap 10 may pop open when compressed.

According to another preferred embodiment of the invention, when it is desirable, or specified, that air pockets 60 are formed on only one side of the composite wrap 10, the polymer layer 40 and layer 20 (or 30) are first extrusion coated, laminated or wax coated to form a first composite having a continuous bond formed between the two respective adjacent surfaces. The composite layer thus formed is then contacted with layer 30 (or 20) as they pass through nip rollers 80, 90 as before. In this case, however, because the first composite has already been formed so that a continuous bond is formed between the two surfaces, at least one of the nip rollers must be heated to affect bonding between the last layer 30 (or 20) and the preformed composite. Temperatures suitable for this bonding will be determined by the type of materials used in the first composite, and are readily determined by a skilled artisan.

In still another preferred embodiment, the composite wrap material 10 may be formed by a lamination process in which the extrudate 70 is replaced by a preformed film. The preformed film is then contacted with layers 20 and 30 as before as they pass through rollers 80, 90. In this embodiment, at least one of the nip rolls must also be heated to affect bonding between the layers. Temperatures suitable for this bonding will be determined by the type of preformed material, and are readily determined by a skilled artisan.

What is claimed is:

1. A composite integral wrap material, comprising:
   a first layer of absorbent material;
   a second layer of printable material; and
   a water vapor impermeable polymer layer interdisposed between said first and second layers, wherein at least one of said first and second layers is discontinuously bonded to a respective side of said polymer layer at spaced locations, so that said at least one of said first and second layers forms air pockets with said polymer layer at locations between the bond locations.

2. The composite material according to claim 1, wherein said first layer comprises a material of cellulosic fibers, and said impermeable polymer layer is pigmented.

3. The composite material according to claim 2, wherein said first layer comprises a material selected from the group of materials consisting of nonwoven tissue, air laid fabric, wet laid tissue, wet or dry creped tissue and embossed papers.

4. The composite material according to claim 1, wherein said second layer comprises a material selected from the group of materials consisting of machine glazed papers and coated papers.

5. The composite material according to claim 1, wherein said impermeable polymer layer comprises a material selected from the group of polymers consisting of a polymer blended with wax, polyethylene, polyvinylidene chloride, ethylene acrylic acid copolymer, polypropylene, polyester, polyisobutylene, nylon, polymethylpentene, ethylene vinyl acetate and hot melts.

6. The composite material according to claim 1, wherein said first layer has fold retention and a basis weight ranging from 5 to 50 lbs/3,000 sq. ft.

7. The composite material according to claim 1, wherein said second layer has fold retention and a basis weight ranging from 10 to 50 lbs/3,000 sq. ft.

8. The composite material according to claim 1, wherein said composite material is part of a bag, and said first layer is an inner layer.

9. The composite material according to claim 1, wherein said composite material is part of a pouch and said first layer is an inner layer.

10. The composite material according to claim 5, wherein the polymer layer is polyethylene.

11. The composite material according to claim 1, wherein air pockets are formed on both sides of said impermeable polymer layer.

12. The composite material according to claim 1, wherein said first and second layers comprise materials having different densities, said first layer having a higher density than said second layer.

13. The composite material according to claim 1, wherein said first and second layers have about the same densities.

14. The composite material according to claim 1, wherein said composite material is a sheet.

15. The composite material of claim 1, in which at least one of said first and second layers is discontinuously bonded to a respective side of said polymer at spaced locations positioned so that said at least one of said first and second layers forms air pockets with said polymer layer at locations between the bond locations and at least some of the air pockets are interconnected.

16. The composite material of claim 1, in which at least one of said first and second layers is discontinuously bonded to a respective side of said polymer layer at spaced locations by bond lines, so that at least one of said first and second layers forms air pockets with said polymer layer at locations between the bond lines, with at least some of the air pockets being interconnected.

17. The composite material of claim 1, in which at least one of said first and second layers is discontinuously bonded to a respective side of said polymer layer at spaced locations by bond lines that are not continuous, so that at least one of said first and second layers forms air pockets with said polymer layer at locations between the bond lines, with at least some of the air pockets being interconnected because the bond lines are not continuous.

* * * * *